United States Patent [19]

Sano

[11] 4,031,294
[45] June 21, 1977

[54] SPLASH-PROOF DEVICE FOR USE IN A STORAGE BATTERY

[75] Inventor: Ichiro Sano, Yokohama, Japan

[73] Assignee: The Furukawa Battery Co., Ltd., Yokohama, Japan

[22] Filed: Feb. 25, 1976

[21] Appl. No.: 661,266

[30] Foreign Application Priority Data

Feb. 27, 1975   Japan ............................. 50-26727

[52] U.S. Cl. ................................................. 429/82
[51] Int. Cl.² ......................................... H01M 2/12
[58] Field of Search ............. 136/170, 177; 429/82, 429/83, 84, 86, 87, 88, 89

[56] References Cited

UNITED STATES PATENTS

| | | | |
|---|---|---|---|
| 1,363,648 | 12/1920 | Hubbard | 136/177 |
| 1,920,261 | 8/1933 | Lavender | 136/177 |
| 3,466,199 | 9/1969 | Hennen | 136/170 |
| 3,802,597 | 4/1974 | Miller | 136/170 |

FOREIGN PATENTS OR APPLICATIONS

| | | | |
|---|---|---|---|
| 1,236,545 | 6/1960 | France | 136/177 |
| 80,508 | 5/1934 | Sweden | 136/177 |

Primary Examiner—Donald L. Walton
Attorney, Agent, or Firm—Bacon & Thomas

[57] ABSTRACT

A splash-proof device for use in a storage battery is a cylindrical member which is provided interiorly with a helical splash-proof baffle for purpose of preventing a liquid spray from being leaked out of an electrolytic cell, and is provided integrally with an electrolytic cell cover. Since a gas escape passage formed in the splash-proof device is made helical, the condensation effect of the liquid spray and the liquid spray leakage-proof effect are both prominent.

6 Claims, 4 Drawing Figures

FIG. 1
FIG. 2
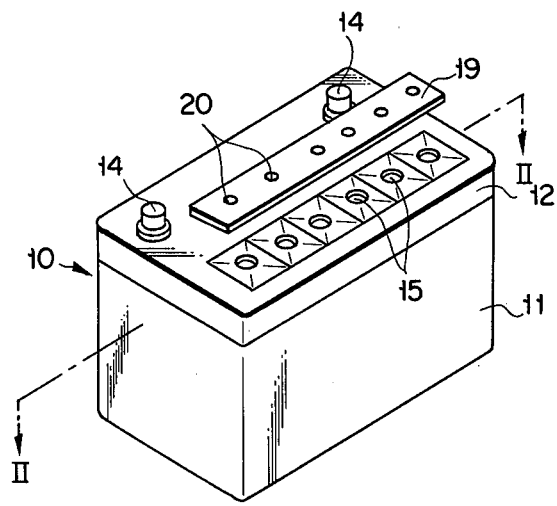
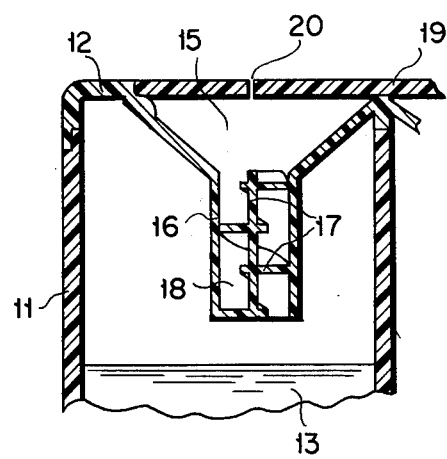
FIG. 3
FIG. 4
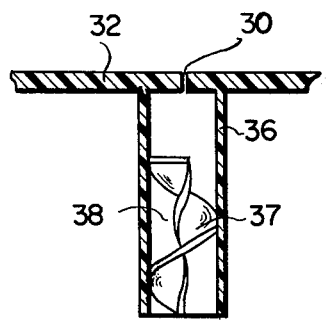
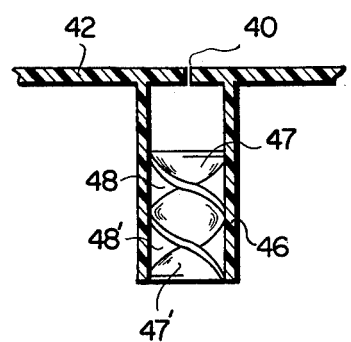

SPLASH-PROOF DEVICE FOR USE IN A STORAGE BATTERY

BACKGROUND OF THE INVENTION

1. Field of the Invention:

This invention relates to a splash-proof device for use in a storage battery, and more particularly to a splash-proof device for use in a storage battery provided integrally with a cell cover for purpose of preventing a liquid spray from being leaked from a cell.

2. Description of the Prior Art:

During charging a storage battery, hydrogen and oxygen gases are evolved, and with this gas evolution a liquid spray, for example, a sulfuric acid liquid spray in the case of a lead acid storage battery is formed. In a vented type storage battery, extreme difficulties are encountered in preventing the liquid spray from being leaked out of the cell. Generally, the vented type storage battery is provided with a screwed or bayonet type plug to permit the aggregation of the evolved liquid spray by means of the splash-proof device inserted inside of the plug. In addition, for purpose of allowing the hydrogen and oxygen gases evolved during charging to escape out of the electrolytic cell, a gas vent should be provided. Particularly in a storage battery for use in an automobile, electric vehicle, etc. the leakage of the liquid spray and the electrolyte should be prevented also for purpose of avoiding corrosion of the car body due to the chemical action of the liquid.

A conventional splash-proof device has constructionally a wide variety of configurations, and one of typical devices is of the construction wherein a pair of circular splash-proof baffles each having a plurality of notches in its circumference are connected to each other in a manner that their central portions are connected by means of a columnar support so as to prevent the notches from being arranged vertically in alignment with each other. Conventionally, this type of splash-proof device is used in a manner that it is inserted inside of the plug whose head is bored with a gas vent. In the conventional splash-proof device like this, however, the leakage of a liquid spray and electrolyte can insufficiently prevent. Further, for example, in the case where the electrolyte is deposited on the device due to vibrations, it drops into the cell less likely. As a result, sometimes the electrolyte effluents out of the device through gas vent and sometimes a liquid film is formed in the gas vent or notch portions, to interrupt the gas escape. Further, the conventional splash-proof device has additional drawbacks that should be provided with the plug, for which reason, for example, when added the electrolyte or water, it takes a considerable period of time to perform the plug-attaching or detaching operation, for which reason the operation efficiency is not increased.

SUMMARY OF THE INVENTION

It is, accordingly, an object of the invention to provide a splash-proof device for use in a storage battery capable of completely preventing the leakage of a liquid spray.

It is another object of the invention to provide a splash-proof device for use in a storage battery formed integrally with a cell cover of the storage battery to eliminate the drawbacks of a conventional splash-proof device.

It is still another object of the invention to provide a storage battery eliminating the necessity of providing a plug for a filling hole by arranging the splash-proof device according to the invention.

The splash-proof device of the invention comprises a cylindrical member provided interiorly with a helical splash-proof baffle, and is formed integrally with a cell cover. The number of helical splash-proof baffle may be one, or two or more. The width of the helical splash-proof plate is preferably larger than the inner radius of the cylindrical member.

BRIEF DESCRIPTION OF THE DRAWING

FIG. 1 is a schematic perspective view showing an example of a storage battery provided with a splash-proof device according to the invention;

FIG. 2 is part of a schematic sectional view taken along the line II—II of FIG. 1;

FIG. 3 is a partial sectional view showing another splash-proof device according to the invention; and FIG. 4 is a partial sectional view showing still another splash-proof device according to the invention provided with a pair of helical splash-proof baffles.

DETAILED DESCRIPTION OF THE INVENTION

A splash-proof device for use in a storge battery according to the invention is constructed such that a helical splash-proof baffle is provided inside a cylindrical member formed integrally with a cover of the cell. In this splash-proof device, the cylindrical member and helical splash-proof baffle are conveniently formed by integral molding. It is also possible, however, to insert and fix a separately made helical splash-proof baffle within the cylindrical member. In the case where the splash-proof device of the invention is formed by molding, the cylindrical member and helical splash-proof baffle should be so designed in thickness as to become smaller in a direction in which a mold is withdrawn, and in addition the splash-proof plate should be so designed in thickness as to become smaller also toward the center of the cylindrical member. The splash-proof device of the invention may be made of a conventional chemicals resistant and thermoplastic resin such as polyvinyl chloride, polypropylene or polyethylene. The splash-proof device of the invention is made integral with the cell cover to which a cell container or case is heat sealed or solvent sealed by use of, during manufacture of the storage battery.

Embodiments of the splash-proof device of the invention are hereinafter described by reference to the attached drawings.

FIG. 1 is a schematic perspective view showing an example of a storage battery equipped with the splash-proof device of the invention, and FIG. 2 is part of a schematic sectional view taken along the line II—II of FIG. 1. This storage battery 10 is made such that a cell cover 12 is placed on a cell container or case container or case 11 which holds an electrolyte 13 and elements. The cell cover 12 is provided with a pair of electrode terminals 14 and 14 on the top, and this top has recessed section with a plurality of filling fumed holes 15. At the under side of the filling funnel holes 15, a corresponding plurality of cylindrical members 16 are integrally formed with the cell cover, and the cylindrical members 16 each has interiorly a helical splash-proof plate 17 integrally formed therewith. Accordingly, each splash-proof device of this example has one end opened at the filling hole 15 in a manner made integral with the cell cover 12 and the other end opened over the electrolyte within the cell, and has a helical gas escape passage 18 opened at its both upper and lower ends. Note that a covering plate 19 for covering the filling holes 15 is detachably provided in said recessed section of the cell cover 12; this covering plate 19 is bored with a corresponding plurality of gas vents 20 to said plurality of filling holes 15.

The width of the helical splash-proof baffle should be at least ½ of the inner diameter of the cylindrical member, or preferably is larger than ½ of this inner diameter, and smaller than this. In the case where the width of the splash-proof baffle is smaller than ½ of said inner diameter, the shortest length of gas escape direct passage is formed along the central axis of the cylindrical member, reducing the effect of the invention. If the baffle width is half the inner diameter of the cylindrical member, the gas escape passage may be a helical configuration to obtain the effect of the invention. But if said plate width is larger than ½ of said inner diameter as shown in FIG. 2, the gas escape passage will become longer.

The action of the storage battery shown in FIGS. 1 and 2 is hereinafter explained. In the case of filling, for example, an electrolyte or water into the cell, the covering plate 19 is dismounted from the filling holes 15, the electrolyte or water will pass through each passage 18 to drop into the cell. Further, in the case where a liquid spray evolves from the electrolyte, it collides with the helical splash-proof baffle 17 while rising through the gas escape passage 18 and condenses in liquid form to drop into the cell. On the other hand, a gas evolved rises passing through the gas escape passage 18 to release from the gas vent 20. Even when the electrolyte 13 is deposited on the splash-proof baffle due to, for example, vibrations, since the gas escape passage 18 has a helical configuration, this deposited electrolyte is dropped for return to the cell without rising through the passage 18 or without forming a liquid film at both the upper and lower ends of said passage.

Table below shows the effect of the splash-proof device of the invention.

mm in the cylindrical member with the inner diameter. In this test, the conventional device is of the construction previously referred to as said typical one and having a pair of circular splashproof baffles.

The above example is a splash-proof device formed integrally with the cell cover 12 (accordingly, the covering plate 19 is necessary) having said recessed section with filling hole, but as shown in FIGS. 3 and 4 a maintenancefree storage batteries can also be made in providing the splash-proof device of the invention in integral form cell covers 32 and 42 without any filling holes. FIGS. 3 and 4 show in section only the cell covering 32 or 42 and a cylindrical members 36 and 46 are formed integrally respectively. In FIG. 3, 37 indicates a helical splash-proof baffle and 38 a gas escape passage. FIG. 4 shows another example of the splash-proof device of the invention in which a pair of helical splash-proof baffles 47 and 47' are provided inside the cylindrical member 46. In this case, a pair of gas escape passages 48 and 48' are formed to raise a more excellent splash-proof effect.

The number of splash-proof baffles of the device according to the invention is not always limited to one but may be two as shown in FIG. 4, or may be more than two. In the case where the number of the splash-proof baffles is two or more, the number of the gas escape passages is also two or more correspondingly. Therefore, if the liquid is filled from one gas escape passage, an air within the device will be escape from the remaining gas escape passage to permit the filling smoothly.

In the splash-proof device according to the invention, a liquid spray evolved, for example, during charging collides with the helical splash-proof baffle while it rises passing through the helical and long gas escape passage, and condensed in liquid form to drop into the cell. Therefore, no liquid spray is leaked out of the storage battery. Further, in this splash-proof device, the device of this invention can effectively prevent not only the effluent of the electrolyte through the gas escape passage due to vibrations, but also the liquid film formation in the gas escape passage Even when electrolyte or water is required in service it can be done through

| | Vibration Test of Storage Battery | | | | |
|---|---|---|---|---|---|
| Inner diameter of cylindrical member | 11 mm | | | 14.5 mm | |
| Length of cylindrical member | 28 mm | | | 35 mm | |
| Acceleration | 5.5G | 7G | 9G | 5.5G | 7G |
| Device of the invention | No liquid leakage | No liquid leakage | No liquid leakage | No liquid leakage | No liquid leakage |
| Conventional device | No liquid leakage | No liquid leakage | Small amount of liquid leakage | No liquid leakage | Small amount of liquid leakage |

The above vibration test was performed on the storage battery while being charged at a 20-hour rate current. The conditions are; the rotation number is 2000 rpm; the vibration width is 2.5 to 4.0 mm; the vibration direction is a simple harmonic vertical motion; and the acceleration is 5.5G, 7G and 9G.

Note that the splash-proof plate of the present device used in this test has a width of 6 mm and a pitch (the vertical length required for one turn of the splash-proof baffle) of 14mm and thickness 0.9 to 1.5 mm in the cylindrical member with 11 mm, and has a width of 7.5 mm, a pitch of 17.5 mm and a thickness of 1.0 to 2.0 the gas escape passage of the splash-proof device of the invention. Further, since the use of the splash-proof device of the invention results in elimination of filling plugs conventionally required, the storage battery can be simplified.

What is claimed is:

1. A splash-proof device for use in a storage battery comprising a cylindrical member provided in a cell cover of a storage battery integrally therewith and open at its bottom with a diameter of the resulting opening being equal to the inner diameter of the cylindrical member, and at least one helical splash-proof baffle having a width equal to at least ½ of the inner diameter of the cylindrical member, said baffle provided inside said cylindrical member.

2. A splash-proof device according to claim 1, wherein said cylindrical member is formed integrally with said splash-proof baffle.

3. A splash-proof device according to claim 1, wherein a helical splash-proof baffle is independently inserted inside said cylindrical member.

4. A splash-proof device according to claim 1, wherein the width of said helical splash-proof baffle is larger than ½ of the inner diameter, but smaller than the inner diameter, of said cylindrical member.

5. A splash-proof device according to claim 1, wherein only one helical splash-proof baffle is provided.

6. A splash-proof device according to claim 1, wherein a plurality of said helical splash-proof baffles are provided.

* * * * *